US012485896B2

(12) United States Patent
Schlacter et al.

(10) Patent No.: US 12,485,896 B2
(45) Date of Patent: Dec. 2, 2025

(54) OPTIMIZATION FUNCTION FOR TURN PLANNING

(71) Applicant: TORC Robotics, Inc., Blacksburg, VA (US)

(72) Inventors: Scott Schlacter, Blacksburg, VA (US); Manas Gupta, Blacksburg, VA (US); Zachary Brock, Blacksburg, VA (US); Mihir Deshingkar, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 177 days.

(21) Appl. No.: 18/234,266

(22) Filed: Aug. 15, 2023

(65) Prior Publication Data

US 2025/0058778 A1 Feb. 20, 2025

(51) Int. Cl.
*B60W 30/18* (2012.01)
*B60W 60/00* (2020.01)

(52) U.S. Cl.
CPC ........... *B60W 30/18009* (2013.01); *B60W 30/18159* (2020.02); *B60W 60/0011* (2020.02); *B60W 60/0025* (2020.02); *B60W 2300/145* (2013.01); *B60W 2552/53* (2020.02)

(58) Field of Classification Search
CPC ..... B60W 30/18009; B60W 30/18159; B60W 60/0011; B60W 2300/145; B60W 2552/53
See application file for complete search history.

(56) References Cited

U.S. PATENT DOCUMENTS

| 8,880,273 | B1 | 11/2014 | Chatham |
| 10,816,983 | B2 | 10/2020 | Cullinane et al. |
| 2021/0094577 | A1* | 4/2021 | Shalev-Shwartz ........... B60W 60/001 |

(Continued)

FOREIGN PATENT DOCUMENTS

| CN | 102570728 B | 11/2014 |
| CN | 105751999 B | 7/2018 |

(Continued)

OTHER PUBLICATIONS

International Search Report and Written Opinion dated Oct. 21, 2024 for International Patent Application No. PCT/US2024/040514.

*Primary Examiner* — Khoi H Tran
*Assistant Examiner* — Tristan J Greiner
(74) *Attorney, Agent, or Firm* — Armstrong Teasdale LLP

(57) ABSTRACT

Embodiments herein include an oversized automated vehicle having a trailer portion and tractor portion performing a J-hook turn at an intersection. The automated vehicle includes an autonomy system for gathering and processing various types of data. The autonomy system generates a candidate trajectory, including the trailer path and the tractor path performing a J-hook turn, and generates driving instructions for the automated vehicle according to a satisfactory candidate trajectory. The autonomy system applies an optimization function for iteratively generating and modifying the candidate trajectory. Using the map data for the intersection, the optimization function modifies the candidate trajectory, such that if the tractor or the trailer were to drive along the predicted tractor path and trailer path, then the tractor and the trailer would perform the J-hook turn while fitting within the drivable surface boundary and inner boundaries (e.g., driving lanes).

20 Claims, 5 Drawing Sheets

(56) References Cited

U.S. PATENT DOCUMENTS

| | | | |
|---|---|---|---|
| 2021/0155289 A1 | 5/2021 | Nilsson et al. | |
| 2021/0380099 A1* | 12/2021 | Lee | G08G 1/0141 |
| 2021/0403032 A1* | 12/2021 | Jing | G05D 1/226 |
| 2021/0403087 A1 | 12/2021 | Mayer | |
| 2022/0227367 A1* | 7/2022 | Kario | G06V 40/103 |
| 2022/0281442 A1* | 9/2022 | Pandy | B60Q 1/525 |
| 2022/0379924 A1 | 12/2022 | Foster et al. | |
| 2023/0072997 A1 | 3/2023 | Chu et al. | |
| 2023/0205208 A1 | 6/2023 | Hult et al. | |
| 2023/0244237 A1* | 8/2023 | Jing | G05D 1/0217 |
| | | | 701/25 |
| 2024/0317254 A1* | 9/2024 | Tran | G06V 20/588 |

FOREIGN PATENT DOCUMENTS

| | | |
|---|---|---|
| CN | 107128366 B | 8/2019 |
| CN | 115083190 A | 9/2022 |
| CN | 116243693 A | 6/2023 |
| EP | 4325462 A1 | 2/2024 |
| JP | 2008067606 A | 3/2008 |
| JP | 2021128690 A | 9/2021 |
| KR | 100552729 B1 | 2/2006 |
| WO | 2020018527 A1 | 1/2020 |
| WO | 2020111088 A1 | 6/2020 |

\* cited by examiner

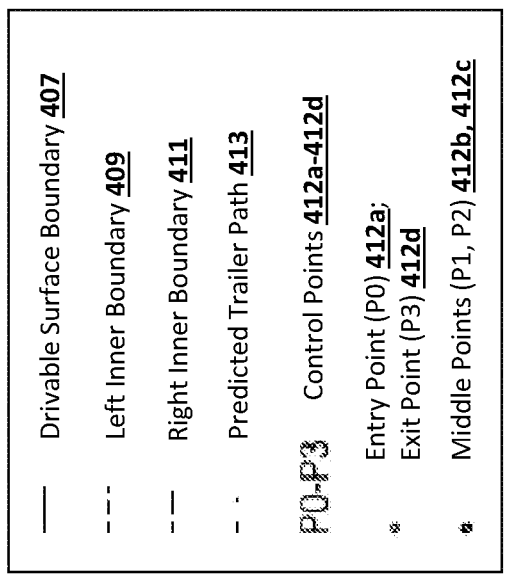
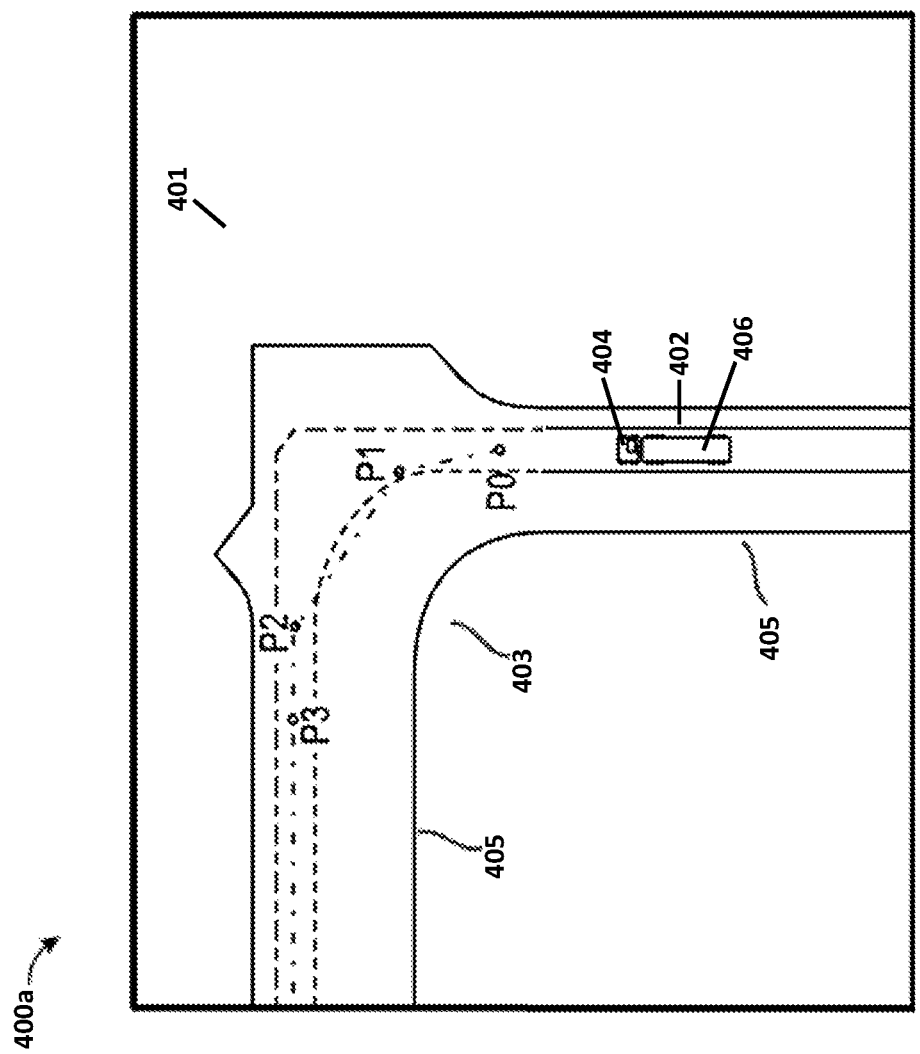

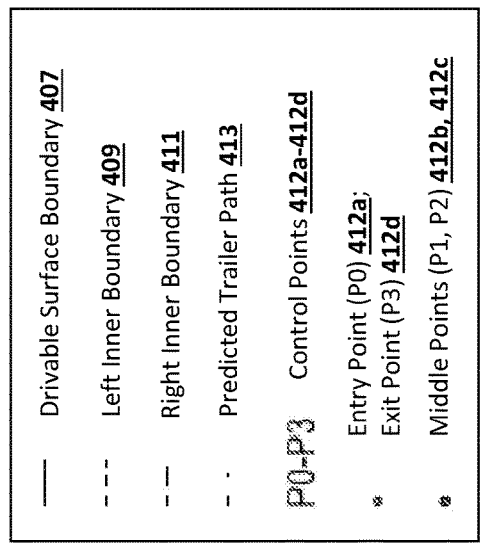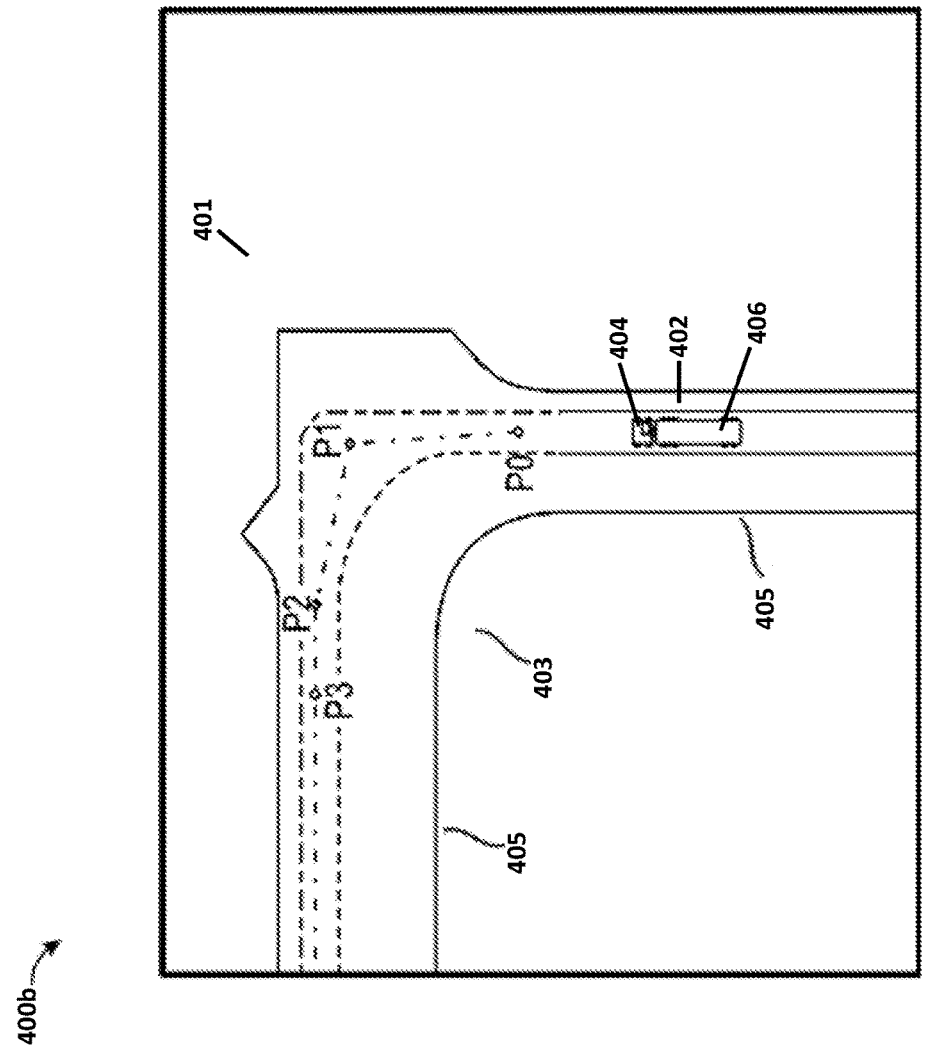

OPTIMIZATION FUNCTION FOR TURN PLANNING

TECHNICAL FIELD

This application generally relates to managing operations of automated vehicles, including machine-learning architectures for determining driving behaviors according to computer vision and object recognition functions.

BACKGROUND

Automated vehicles with autonomous capabilities include computing components for planning and causing motion of the automated vehicle (or "ego vehicle") to, for example, follow a path with respect to the contours of a roadway, obey traffic rules, and avoid traffic and other objects in an operating environment. The motion-planning components may receive and act upon inputs from various externally facing systems, such as, for example, LiDAR system components, camera system components, and global navigation satellite systems (GNSS) inputs, among others, which may each help generate required or desired behaviors. These required or desired behaviors may be used to generate possible maneuvers for the ego vehicle within the operating environment.

An automated vehicle may include a tractor-trailer vehicle having an outsized length, which presents a problem in conventional automated vehicles. A particular problem in path planning arises when the vehicle has an outsized length. The combined length of a tractor and trailer causes problems in navigating certain intersections. The length of the tractor and trailer requires a comparatively larger turning radius than smaller vehicles. Ordinarily, a "J-hook" turn (also known as a "buttonhook" turn or "right-angle" turn) is necessary for tractor-trailers because of the length and rigidity of the trailer in-tow. The J-hook maneuver provides this larger radius by initially swinging the truck in the opposite direction of the turn, creating a wider arc for the trailer to follow. Without this maneuver, the trailer could clip the corner, other vehicles, or infrastructure during the turn, leading to potential accidents and damage.

The "J-hook" turn is a turning maneuver used by tractor-trailers to navigate through intersections, especially when dealing with a tight or restrictive space. This technique is necessary due to the large size and extended length of the trailer and the space needed to turn the length of the tractor and trailer, without hitting other vehicles or roadside infrastructure. Typically, as the tractor approaches the intersection, a driver continues beyond an ordinary turning apex or sometimes swings the tractor in the opposite direction of the turn. This maneuver helps to position the trailer for the turn and creates a wider arc for the trailer to follow; this action is the essence of the J-hook maneuver. The driver then sharply turns the tractor into the desired direction of the turn. Because of the initial outward swing, the trailer now has enough clearance to follow the tractor's path without clipping the corner, apex, other vehicles, or roadside objects. After successfully navigating the turn, the driver straightens out the tractor-trailer and continues to drive in the new direction.

What is needed is a means for an automated vehicle having an outsized length for a given turn to perform a J-hook turn.

SUMMARY

Automated vehicles often use various types of environmental cues to navigate. An automated vehicle consumes various types of sensor data from on board and remote sensing systems to confirm the automated vehicle's location, identify obstacles, and otherwise determine the automated vehicle's circumstances. For instance, when navigating a roadway, the automated vehicle may receive and evaluate camera data and/or LIDAR sensor data to identify painted lane lines or markers. The automated vehicle uses the lane lines as a reference point and navigation cue. In some circumstances, when the automated vehicle needs to plan and execute a J-hook turn, complications arise with using lane lines or other conventional cues.

When a tractor trailer or other oversized vehicle (e.g., bus) performs a J-hook turn, the tractor (or front portion of the vehicle with frontend steerable wheels) does not necessarily follow boundaries of the lane lines. An oversized automated vehicle would have difficulty planning and executing the J-hook if ignoring typical driving cues for only a short period of time needed to execute the J-hook. As an example, the automated vehicle may reference and follow a center lane line as a navigation and positioning cue. When the automated vehicle approaches an intersection without a center lane line or with turning lane marker, the automated vehicle cannot continue to follow the lane line marker in the same manner as before the intersection. The tractor needs to stay within drivable surface boundaries, despite disobeying conventional driving norms. Moreover, the tractor and trailer need to avoid collisions with other traffic vehicles that could be on either side of the automated vehicle, particularly at intersections.

Embodiments disclosed herein address the shortcomings in the art and may provide any number of additional or alternative benefits. An automated vehicle includes an autonomy system for gathering and processing various types of data. The autonomy system generates a candidate trajectory, including a trailer path and tractor path for performing a J-hook turn, and generates driving instructions for operating the automated vehicle according to a satisfactory candidate trajectory. The autonomy system applies an optimization function for generating and iteratively modifying the candidate trajectory as the automated vehicle's performance of the J-hook turn when traversing the intersection. Using the map data for the intersection, the optimization function modifies the candidate trajectory, such that if the tractor or the trailer were to drive along the predicted tractor path and trailer path, then the tractor and the trailer would perform the J-hook turn while fitting within the drivable surface boundary and inner boundaries (e.g., driving lanes).

In an embodiment, a method for navigation planning for an automated vehicle, the method comprising detecting, by a processor of the automated vehicle, an intersection requiring a J-Hook turn according to map data having the intersection; generating, by the processor, a plurality of boundaries, including one or more inner boundaries and a drivable surface boundary; generating, by the processor, a plurality of control points defining a curve for a trailer path of a trailer portion of the automated vehicle, the control points including an entry point, an exit point, and one or more middle points; generating, by the processor, a trailer path of the automated vehicle using the control points for the curve, and a tractor path of a tractor portion of the automated vehicle based upon the trailer path, thereby generating a candidate trajectory having the tractor path and trailer path; and in response to the processor determining that the candidate trajectory fails to satisfy a boundary of the plurality of boundaries, updating, by the processor, the candidate trajectory by adjusting the one or more middle points of the plurality of control points defining the curve of the trailer path.

In another embodiment, a system for navigation planning for an automated vehicle, the system comprising a non-transitory computer-readable memory on board an automated vehicle configured to store map data associated with a geographic location having an intersection; and a processor of the automated vehicle configured to: detect an intersection requiring a J-Hook turn according to map data having the intersection; generate a plurality of boundaries, including one or more inner boundaries and a drivable surface boundary; generate a plurality of control points defining a curve for a trailer path of a trailer portion of the automated vehicle, the control points including an entry point, an exit point, and one or more middle points; generate a trailer path of the automated vehicle using the control points for the curve, and a tractor path of a tractor portion of the automated vehicle based upon the trailer path, thereby generating a candidate trajectory having the tractor path and trailer path; and in response to the processor determining that the candidate trajectory fails to satisfy a boundary of the plurality of boundaries, update the candidate trajectory by adjusting the one or more middle points of the plurality of control points defining the curve of the trailer path.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

FIGS. 4A-4B depict graphical representations of an operating environment including an intersection in a roadway traversed by an automated vehicle, according to an embodiment.

DETAILED DESCRIPTION

Figure 1:
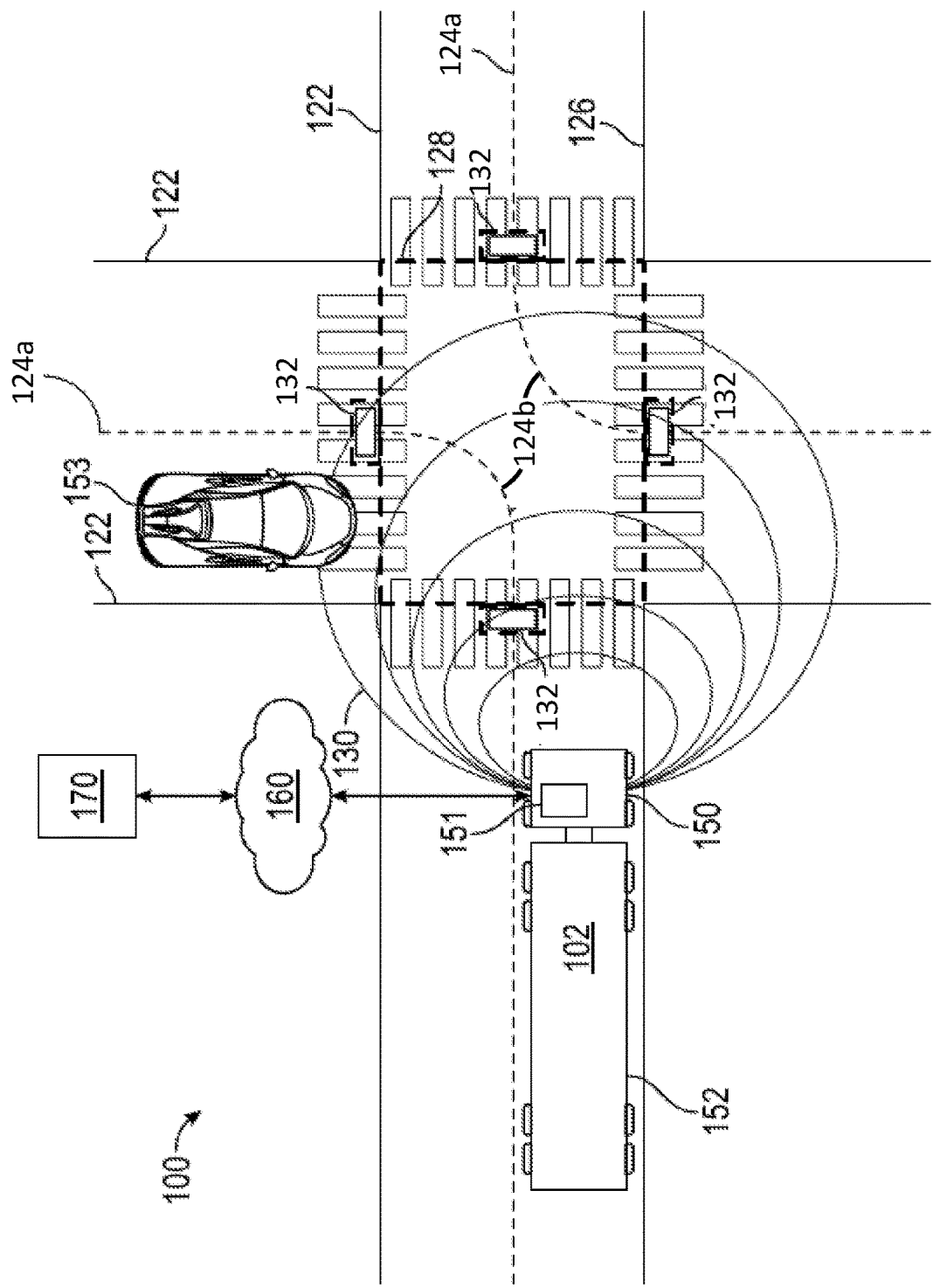
FIG. 1 is a bird's eye view of a roadway environment including a schematic representation of an automated vehicle (e.g., automated tractor-trailer truck) and aspects of an autonomy system of the automated vehicle, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 shows a roadway environment 100, including various objects located at the roadway environment 100 and characteristics of roads intersecting at the roadway environment 100, according to an embodiment. The characteristics of the roads include an intersection 103, crosswalks 105 for pedestrians, a traffic vehicle 153, and lane lines 122, 124a-124b, 126, including boundary lines 122, 126, and a center lane line 124a and turning lane line 124b (generally referred to as inner lines 124). The objects include an automated vehicle 102 (sometimes referred to as an "ego" or "ego vehicle"), shown as an autonomous truck 102 approaching the intersection 103; and traffic lights 132 situated around the intersection 103.

Further, FIG. 1 displays aspects of an autonomy system 151 of the autonomous truck 102 that captures various types of information about the environment 100 and generates driving instructions for the autonomous truck 102. The autonomy system 151 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. While this disclosure refers to a truck 102 having a tractor 150 and trailer 152 as the automated vehicle, it is understood that the automated vehicle could be any type of vehicle including an automobile, a mobile industrial machine, or the like. While the disclosure will discuss a self-driving or driverless autonomous system, it is understood that the autonomous system could alternatively be semi-autonomous having varying degrees of autonomy or autonomous functionality. In some embodiments, various types of data or software components of the autonomy system may be stored or executed by the remote server 170, which the remote 170 reports back to the autonomy system 151 of the truck 102 via the network 160.

As mentioned, the autonomy system 151 includes hardware and software components logically arranged into several types of logical components, including: (1) perception components; (2) maps and localization components ("localization components"); and (3) behavior, planning, and control components ("behavior components").

The function of the perception components is to sense features of the roadway environment 100 surrounding truck 102 and interpret information related to the features. To interpret the surrounding roadway environment 100, a perception engine in the autonomy system 151 of the autonomous truck 102 may identify and classify objects or groups of objects in the roadway environment 100. For example, a perception engine associated with various sensors (e.g., LiDAR, camera, radar, etc.) of the autonomy system 151 may identify one or more objects (e.g., pedestrians, vehicles, debris, etc.) and features of the roadway (e.g., lane lines 122, 124), and classify the objects and roadway features. As shown in FIG. 1, the perception components of the autonomous truck 102 capture information about the roadway environment 100 with a perception radius 130.

The maps and localization components of the autonomy system 151 may be configured to determine where on a pre-established digital map the truck 102 is currently located. In some cases, maps and localization components sense the environment 100 surrounding the truck 102 (e.g., via the perception system) and correlate features of the sensed environment 100 with details (e.g., digital representations of the features of the sensed environment) on the digital map.

After the autonomy system 151 of the truck 102 determines the truck's 102 location with respect to the digital map features (e.g., location on the roadway, upcoming intersections intersection 103, traffic lights 132), the autonomy system 151 of the autonomous truck 102 plans and executes maneuvers and/or routes with respect to the features of the digital map. The behaviors, planning, and control components of the autonomy system 151 may be configured to make decisions about how the truck 102 should move through the environment 100 to get to a goal or destination. The behaviors, planning, and control components may consume information from the perception and maps/localization modules to determine where the autonomous truck 102 is located relative to the aspects of the surrounding environment roadway environment 100.

As shown in FIG. 1, the perception components (or perception systems) aboard the truck 102 may help the truck 102 perceive the environment 100 out to a perception radius 130. The actions of the truck 102 may depend on the extent of perception radius 130. The autonomy system 151 may include perception components or subsystems for managing operations of various perception sensors, including ingesting and processing sensor data inputs gathered and generated by the various sensors. The perception sensors and perception systems include, for example, a camera system for one or more cameras, a LiDAR system for one or more LiDAR sensors, a radar system for one or more radar sensors, a GNSS receiver and geolocation (e.g., GPS) system, and an inertial measurement unit (IMU) for inertial measurement sensors (e.g., gyroscope, accelerometer), among other types of perception sensors.

As mentioned, the perception components of the truck 102 include, for example, one or more cameras (not shown) mounted around the truck 102 and coupled to the autonomy system 151. The cameras capture imagery of the roadway environment 100 surrounding the truck 102 within the cameras' field-of-view (e.g., perception radius 130) and generate image data for the imagery. The camera sends the image data generated to the perception module of the autonomy system 151. In some embodiments, the autonomy system 151 transmits the image data generated by the cameras to the remote server 170 for additional processing.

The perception module of the autonomy system 151 may receive input sensor data from the various sensors, such as the one or more cameras, LiDAR, GNSS receiver, and/or IMU (collectively "perception data") to sense the environment 100 surrounding the truck 102 and interpret or recognize objects and roadway features in the environment 100. To interpret the surrounding environment, the perception module (or "perception engine") of the autonomy system 151 may identify and classify objects, features, characteristics of objects, or groups of objects in the environment 100. For instance, the truck 102 may use the perception module to identify one or more objects (e.g., pedestrians, vehicles, debris, etc.) or features of the roadway (e.g., intersections, road signs, traffic lights 132, lane lines 122, 124, 126) before or beside the truck 102 and classify the objects or road features in the environment 100. The perception module of the autonomy system 151 may include software components for performing an image classification function and/or a computer vision function. In some implementations, the perception module of the autonomy system 151 may include, communicate with, or otherwise execute software for performing object tracking and/or object classification functions allowing the autonomy system 151 to perform object detection and classification operations.

As an example, as the truck 102 approaches an intersection 135, the perception module of the autonomy system 151 receives image data from the cameras (or other perception sensors), capturing imagery of roadway features, such as the traffic lights 132, crosswalks, and lane lines 122, 124, 126. The autonomy system 151 executes the object recognition and classification functions to identify and classify these roadway features. When the object classification function detects a particular traffic light 132, the autonomy system 151 executes additional software components for classifying the status of the traffic light 132 (e.g., red, yellow, green). The autonomy system 151 then determines further driving operations according to the status of the traffic light (e.g., stop, slow down, continue), as well as other inputted information.

The autonomy system 151 may receive and collect perception data (or sensor input data) from the various perception sensors of the truck 102. The perception data may represent the perceived environment 100 surrounding the truck 102, for example, and may be collected using aspects of the perception system described herein. The perception data can come from, for example, one or more of the LiDAR system, the camera system, and various other externally-facing sensors and systems on board the truck 102 (e.g., the GNSS receiver). For example, where the truck 102 includes a sonar or radar system, the sonar and/or radar systems may collect those types of perception data. As the truck 102 travels along the roadway, the autonomy system 151 may continually receive perception data from the various perception systems on the truck 102. The autonomy system 151 may receive, collect, and analyze the perception data periodically and/or continuously.

In some cases, the autonomy system 151 may compare the collected perception data with stored data. The system may identify and classify various features detected in the collected perception data from the environment 100 against the features stored in a digital map. For example, the detection systems may detect the lane lines 122, 124, 126 by comparing the detected lane lines 122, 124, 126 against pre-stored information about lane lines stored in a digital map. Additionally, the detection systems could detect roadway features, such as the traffic lights 132 and crosswalks 134, by comparing such roadway features against pre-stored roadway features in the digital map. The roadway features may be stored as points (e.g., signs, small landmarks), road boundaries (e.g., lane lines 122, 124, 126, road edges), or polygons (e.g., lakes, large landmarks) and may have various properties (e.g., style, visible range, refresh rate). The roadway features may control how the autonomy system 151 interacts with the various aspects of the environment 100. In some embodiments, based on the comparison of the detected features against the known features stored in the digital map(s), the autonomy system 151 may generate a confidence level, representing a confidence of the truck 102 location with respect to the features on the digital map. The autonomy system 151 references the confidence level to confirm the actual location of the truck 102.

Figure 2:
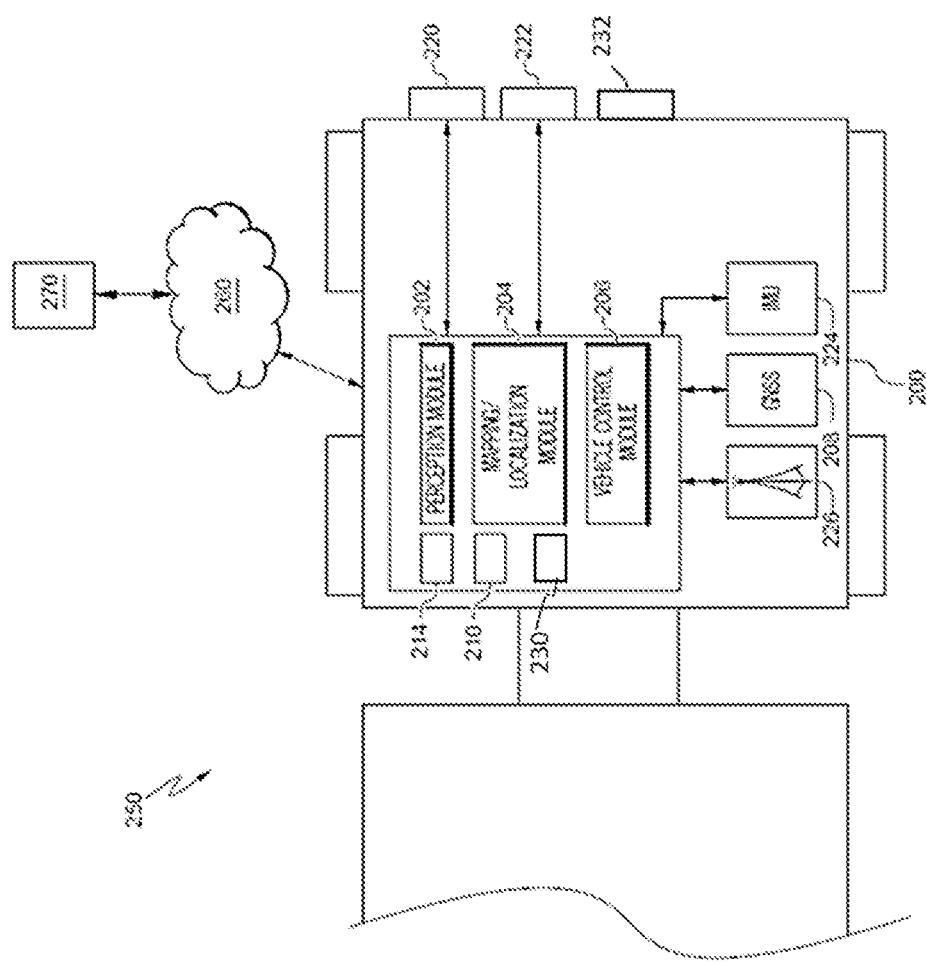
FIG. 2 shows example components of an autonomy system on board an automated vehicle, such as an automated vehicle, according to an embodiment.

FIG. 2 shows example components of an autonomy system 250 on board an automated vehicle, such as an automated truck 200 (e.g., automated truck 102), according to an embodiment. The autonomy system 250 may include a perception system comprises hardware and software components for the vehicle system 200 to perceive an environment (e.g., environment 100). The components of the perception system include, for example, a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include additional, fewer, or different components or systems. Similarly, each of the components or system(s) may include additional, fewer, or different components. Additionally, the systems and components shown may be combined or divided in various ways. The perception systems of the autonomy system 250 may help the truck 200 perceive the environment and perform various actions.

The camera system 220 of the perception system may include one or more cameras mounted at any location on the truck 200, which may be configured to capture images of the environment surrounding the truck 200 in any aspect or field of view (FOV) (e.g., perception field 130). The FOV can have any angle or aspect such that images of the areas ahead of, to the side, and behind the truck 200 may be captured. In some embodiments, the FOV may be limited to particular areas around the truck 200 (e.g., forward of the truck 200) or may surround 360 degrees of the truck 200. In some embodiments, the image data generated by the camera system(s) 220 may be sent to the perception module 202 and stored, for example, in memory 214. In some embodiments, the image data generated by the camera system(s) 220, as well as any classification data or object detection data (e.g., bounding boxes, estimated distance information, velocity information, mass information) generated by the object tracking and classification module 230, can be transmitted to the remote server 270 for additional processing (e.g., correction of detected misclassifications from the image data, training of artificial intelligence models).

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may be based on 24 GHZ, 77 GHZ, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5 g). In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck. Various other known circuits may be associated with the autonomy system 250, including signal-conditioning circuitry, communication circuitry, actuation circuitry, and other appropriate circuitry.

The memory 214 of autonomy system 250 includes any non-transitory machine-readable storage medium that stores data and/or software routines that assist the autonomy system 250 in performing various functions, such as the functions of the perception module 202, the mapping/localization module 204, the vehicle control module 206, or an object tracking and classification module 230, among other functions of the autonomy system 250. Further, the memory 214 may also store data received from various inputs associated with the autonomy system 250, such as perception data from the perception system. For example, the memory 214 may store image data generated by the camera system(s) 220, as well as any classification data or object detection data (e.g., bounding boxes, estimated distance information, velocity information, mass information) generated by the object tracking and classification module 230.

As noted above, perception module 202 may receive input from the various sensors, such as camera system 220, LiDAR system 222, GNSS receiver 208, and/or IMU 224 (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, etc.) or features of the roadway (e.g., intersections, road signs, lane lines) before or beside a vehicle and classify the objects in the road. In some embodiments, the perception module 202 may include an image classification function and/or a computer vision function. In some implementations, the perception module 202 may include, communicate with, or otherwise utilize the object tracking and classification module 230 to perform object detection and classification operations.

The system 250 may collect perception data. The perception data may represent the perceived environment surrounding the truck 200, for example, and may be collected using aspects of the perception system described herein. The perception data can come from, for example, one or more of the LiDAR system, the camera system, and various other externally-facing sensors and systems on board the truck 200 (e.g., GNSS 208 receiver). For example, on vehicles having a sonar or radar system, the sonar and/or radar systems may collect perception data. As the truck 200 travels along the roadway, the system 250 may continually receive data from the various systems on the truck 200. In some embodiments, the system 250 may receive data periodically and/or continuously.

The system 250 may compare the collected perception data with stored data. For instance, the system 250 may identify and classify various features detected in the collected perception data from the environment with the features stored in a digital map. For example, the detection systems of the system 250 may detect the lane lines and may compare the detected lane lines with lane lines stored in a digital map. Additionally, the detection systems of the system 250 could detect the traffic lights by comparing such features with features in a digital map. The features may be stored as points (e.g., signs, small landmarks), lines (e.g., lane lines, road edges), or polygons (e.g., lakes, large landmarks) and may have various properties (e.g., style, visible range, refresh rate, etc.), where such properties may control how the system 250 interacts with the various features. In some embodiments, based on the comparison of the detected features against the features stored in the digital map(s), the system 250 may generate a confidence level, which may represent a confidence in the calculated location of the truck 200 with respect to the features on a digital map and hence, the actual location truck 200 as determined by the system 250.

The image classification function may determine the features of an image (e.g., visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module (e.g., the object detection and classification module 230) that may be communicatively coupled to a repository of images or image data (e.g., visual data and/or point cloud data) which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithm), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size). The computer vision function may be embodied by a software module (e.g., the object detection and classification module 230) that may be communicatively coupled to a repository of images or image data (e.g., visual data; point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, or the like. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard automated vehicle, or another vehicle, can run a route several times and collect the location of all targeted map features relative to the position of the truck 200 conducting the map generation and correlation. These repeated observations can be averaged together in a known way to produce a highly accurate, high-fidelity digital map. This generated digital map can be provided to each truck 200 (e.g., from a remote server 270 via a network 260 to the truck 200) before the truck 200 departs on a mission so the truck 200 can carry the digital onboard and use the digital map data within the mapping/localization module 204. Hence, the truck 200 and other vehicles (e.g., a fleet of trucks similar to the truck 200) can generate, maintain (e.g., update), and use a particular instance of each truck's 200 generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines) the truck may use the truck 200 control module 206 and its associated systems to plan and execute maneuvers and/or routes with respect to the features of the environment. The vehicle control module 206 may make decisions about how the truck 200 will move through the environment to get to a goal or destination as the truck 200 completes the mission. The vehicle control module 206 may consume information from the perception module 202 and the maps/localization module 204 to know where the truck 200 is relative to the surrounding environment and what other traffic actors (e.g., traffic vehicle 153) are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system). The vehicle control module 206 may be configured to avoid obstacles in the environment surrounding the truck and may be configured to use one or more system inputs to identify, evaluate, and modify a vehicle trajectory. The vehicle control module 206 is depicted as a single module, but vehicle control module 206 can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

Figure 3:
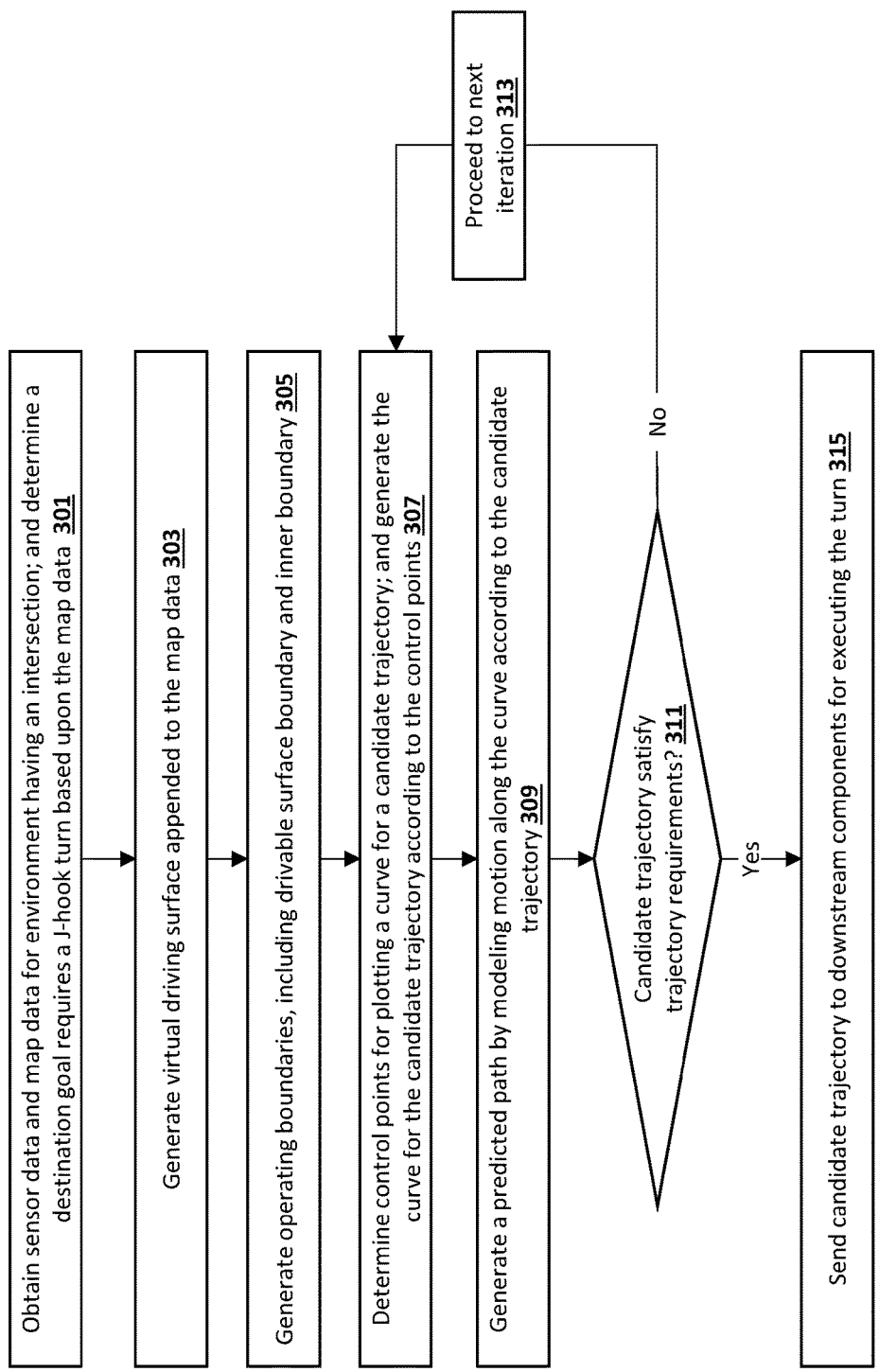
FIG. 3 shows operations of a method for planning and executing a turn in a confined space by an autonomy system of an automated vehicle, according to an embodiment.

FIG. 3 shows operations of a method 300 for planning and executing a turn in a confined space by an autonomy system of an automated vehicle, according to an embodiment. The embodiment describes a scenario in which the automated vehicle navigates an operating environment having an intersection, where the automated vehicle must complete a J-hook turning maneuver in a confined space to arrive at an end goal. The embodiment describes a scenario in which the automated vehicle must complete a turn across an intersection (typically, a left turn in the United States across oncoming traffic lanes). But embodiments are not so limited, and may include nearly any circumstance in which the automated vehicle must plan and complete the J-hook turn, such as turning left or right at a dead end or navigating a relatively confined backstreet or neighborhood street, among other circumstances.

In operation 301, the autonomy system obtains sensor data and map data for an operating environment in which the automated vehicle approaches an intersection (or confined space having a tight turn). The autonomy system determines that the automated vehicle must perform a J-hook turn based upon the map data and other sensor data. For example, the autonomy system may begin executing the turn-planning functions of the method 300, including optimization function iterations (as in operations 307-311), at some distance (e.g., 500-meter distance) before the intersection.

The autonomy system is preprogrammed with an overall destination of the automated vehicle's trip. Based upon the map data and navigation functions, the autonomy system determines that the automated vehicle arrives at an intersection having dimensions requiring the J-hook maneuver.

The autonomy system then executes various operations for planning a feasible J-hook turn and, if a feasible J-hook turn is possible, executing the J-hook turn; these operations may, for example, optimize the planned path according to an objective function (sometimes referred to as an "optimization function" or "cost function"), among other types of operations and functions. The goal of the autonomy system is plan and execute a trajectory of the automated vehicle through the intersection, where the tractor follows a tractor path following a drive line for performing the J-hook and stays within driving boundaries, and the trailer follows a trailer path for a drive line that stays within inner boundaries obeying traffic norms and avoiding traffic or other obstacles.

Typically, the automated vehicle stays within a lane when performing turns while navigating the roadway. The pre-stored map data for the geographic locations containing certain intersection may include metadata tags or database entries indicating, for example, a turn at the intersection requires a sharp turn or requires a J-hook turn.

In operation 303, the autonomy system generates a virtual driving surface, appended to the map data. The drivable surface includes a virtual representation of the drivable, navigable space of the roadway. The drivable surface encompasses, for example, the roadway leading to the intersection, the roadway of the intersection, and the roadway departing the intersection. The drivable surface excludes and is bounded by, for example, a curb, sidewalk, or other end of the roadway. In some implementations, the autonomy system is configured to incorporate a permissive buffer into the drivable surface, encompassing some permissive buffer distance beyond the end of the roadway.

In some implementations, the autonomy system temporarily or logically modifies the image data of the map data to create a "fake" lane in the map data representing the navigable corridor for traversing the intersection.

In operation 305, using the map data, the autonomy system generates or otherwise determines operating boundaries for performing the J-hook turn, which includes determining a drivable surface boundary and one or more inner boundaries.

The inner boundaries represent the functional boundaries that the automated vehicle determines and abides before, in the middle of, after the intersection. The inner boundaries include, for example, lane boundaries for legally navigating the intersection. The autonomy system determines the inner boundaries based upon the sensor data and input map data that indicate, for example, driving lanes, roadway obstacles (e.g., median island), traffic vehicles, and other operational restrictions. As an example, at the middle of the intersection, the lefthand boundary includes a typical interior boundary of a left turn lane that the automated vehicle must avoid (e.g., navigate around). Oftentimes, the road surface in the intersection includes painted lane markings for the lefthand boundary to guide vehicles through the intersection, but does not include painted lane markings for a righthand boundary. The automated vehicle must navigate between these inner boundaries.

In some implementations, the autonomy system may artificially determine the righthand boundary, and/or modify a map data representation of the righthand boundary, as a forward propagation of the righthand boundary of the automated vehicle, proceeding alongside the automated vehicle from an entry point before the intersection, through the intersection as the automated vehicle performs the J-hook turn, to an exit point after the intersection, such that the righthand boundary is the forward propagation of the righthand boundaries before and after the turn length. Each inner boundary represented in the image data of the map data is a geometric element defined by a collection of inner boundary values, which may be coordinate values of points or geometric shapes (e.g., lines) within a two-dimensional or three-dimensional plane in the map data.

As an example, when performing the J-hook turn, the tractor essentially performs a roughly squared or nearly 90-degree turn. Likewise, when planning the J-hook turn, the autonomy system forward-propagates a righthand inner boundary existing before entering the intersection, through the J-hook, to the exit of the intersection. The righthand boundary of the tractor would essentially form a right-angle (as shown in FIGS. 4A-4B, discussed further below). The right inner boundary would logically come to a point, perpendicular to both the entry point and the exit point of the intersection. In this way, the autonomy system can predictably estimate and model the righthand inner boundary, which the tractor should stay within or within some distance beyond the right inner boundary.

As mentioned, the drivable surface boundary includes surfaces in the environment that the automated vehicle may drive over to perform the J-hook turn. The drivable surface is represented in the image data of the map data by one or more geometric elements defined by a collection of drivable surface boundary values, which may be coordinate values of points or geometric shapes (e.g., lines) within a two-dimensional or three-dimensional plane in the map data.

To determine control points and other aspects of the candidate trajectory (e.g., tractor path, trailer path) for performing the J-hook (as described in later operation 307), the autonomy system references or computes various parameters, which may be preconfigured or dynamically calculated. In some cases, administrators of the automated vehicle may enter and preconfigure safety buffer parameters, such as a buffer distances defining an amount of distance away from any adjacent lane and/or away from any border of the drivable surface. These buffer distances may be applied for determining the inner boundaries and/or the drivable surface boundaries.

In operation 307, the autonomy system determines control points for planning a curve for a trailer path of a candidate trajectory, which includes the trailer path and a tractor path that the tractor would follow to cause the trailer path. After placing the control points, the autonomy system executes planning functions for generating the components (e.g., tractor path, trailer path) of the candidate trajectory for planning the turn, such as an objective function that generates a cost value (or "reward value") that is used to evaluate a potential path. For instance, the autonomy system generates a candidate trajectory, generates and evaluates the cost value for optimality, and then iterates on the candidate trajectory to improve the cost value. As mentioned, to determine the control points and the curve, the autonomy system retrieves pre-stored parameters and/or computes parameters of the turn-planning functions.

The tractor path of the candidate trajectory defines a driving line of the tractor to traverse the intersection when the tractor performs the J-hook turn. The trailer path of the candidate trajectory defines the driving line of the trailer traversing the intersection, which is the resulting path of the trailer caused by the tractor. For each iteration of generating an estimated candidate trajectory, the autonomy system generates the control points for the trailer path and then computes the tractor path that would cause the trailer to perform/follow the trailer path resulting from the control points generated for the iteration. The autonomy system is preconfigured with geometric properties of the automated vehicle's tractor and trailer, allowing the path-planning functions of the autonomy system to compute the trailer path and then compute (or reverse engineer) the tractor path need to cause the computed trailer path.

The autonomy system may place the control points according to coordinate values of the control points. In some cases, the control points include coordinate values (x, y) in a coordinate plane representing the operating environment of the intersection. Additionally or alternatively, in some cases, the control points include geographical coordinate values (e.g., latitude, longitude) within the operating environment of the intersection.

The control points of the curve include fixed entry and exit points in space, where the trailer enters and exits the intersection for performing the J-hook turn. The autonomy system determines the entry and exit points based upon some preconfigured distance before or after the intersection using the map data. The control points further include adjustable middle points, which the autonomy system generates and iteratively adjusts until identifying estimated trailer and tractor paths of a given iteration that satisfy the trajectory requirements (e.g., perform the turn within the boundaries). The functions for planning the curve of the trailer path include geometric functions (e.g., Bezier curve functions) for generating the estimated curve using the control points, such that adjusting the control points changes the shape of the curve.

The optimization handles modifying the control points as necessary to generate the curve of the trailer path and the tractor to be able to fulfill the objective function of reaching the exit point while keeping the trailer and the tractor within the boundaries as best as possible. For each iteration, the optimization function attempts to minimize a cost of staying within the boundaries by updating the shape of the trailer path, such that both the tractor and the trailer are within the boundaries.

In operation 309, the autonomy system generates a predicted trailer path and tractor path by modeling motion of the tractor and the trailer along the curve according to the candidate trajectory. The inputs into the optimization function include the plurality of boundary values, including the drivable surface boundary values, the inner boundary values, and the control points, among others. Using the inputs, the optimization function optimizes the curve by adjusting the middle points of the curve. The optimization function can evaluate where the tractor would need to drive, as a resulting tractor path, if the trailer (e.g., rear axle of the trailer) were to follow the trailer path having the curve. The optimization function or cost function would determine a cost based upon the tractor path and trailer path of the candidate trajectory. The autonomy system iteratively generates these aspects of the candidate trajectory by iteratively adjusting the middle control points to find a minimal cost.

In some embodiments, the autonomy system performs a gradient descent function for computing the costs for the paths according to the current iteration of the middle control points. The autonomy system calculates each iteration of the middle control points by computing the gradient to minimize the cost until identifying the curve that would produce a trailer path and tractor path of a satisfactory candidate trajectory.

In some implementations, the autonomy system may forward-propagate a virtual representation of the automated vehicle in a coordinate system of the operating environment having the intersection. In this way, the autonomy system may evaluate the performance of the determined candidate trajectory, trailer path, and tractor path for a given iteration of the turn-planning functions.

In determination operation 311, the autonomy system determines whether the candidate trajectory satisfies trajectory requirements, which may include the inner boundaries, the drivable surface boundaries, and cost thresholds. In this way, the autonomy system determines whether to execute another iteration of the turn-planning functions for adjusting the control points and modifying the shape of the curve of the trailer path.

In operation 313, if the autonomy system determines (in operation 311) that the candidate trajectory produces a resulting path that fails the trajectory requirements, then the autonomy system enters a next iteration of the turn-planning functions for adjusting the control points and modifying the components of the candidate trajectory.

The optimization function and cost function generate iterations of the candidate trajectories by modifying the candidate trajectories, such that autonomy system generates iterations of the candidate trajectory until generating a candidate trajectory having a path that would stay within the operational boundaries and satisfies any number of additional trajectory requirements.

In a later iteration of operation 307, the autonomy system modifies the control points for the next iteration of the candidate trajectory. In the later iteration of operation 309, the autonomy system generates the next iteration of the predicted path by modeling the motion of automated vehicle along the curve according to the next iteration of the candidate trajectory. In the determination operation 311 for the later iteration, the autonomy system determines whether the next iteration of the candidate trajectory satisfies the trajectory requirements. The autonomy system continually iterates through the operations for modifying the candidate trajectory until the autonomy system generates a candidate trajectory that satisfies the trajectory requirements.

In operation 315, if the autonomy system determines (in operation 311) that the candidate trajectory produces a resulting path that satisfies the trajectory requirements, then the autonomy system sends the candidate trajectory information to downstream components that operate the automated vehicle for executing the J-hook turn.

FIGS. 4A-4B depict graphical representations 400a-400b (generally referred to as graphical representations 400) of an operating environment 401 including an intersection 403 in a roadway 405 traversed by an automated vehicle 402, according to an embodiment. In FIG. 4A, an autonomy system of the automated vehicle 402 generates an earlier iteration of a candidate trajectory for performing a J-hook turn through the intersection, where the candidate trajectory fails to satisfy trajectory requirements. In FIG. 4B, the autonomy system of the automated vehicle generates a later iteration of a candidate trajectory for performing the J-hook turn through the intersection, where the candidate trajectory satisfies the trajectory requirements.

The graphical representations 400 show virtual representations of data generated by the autonomy system for navigating the automated vehicle 402. The graphical representations 400 include aspects of the real-world operating environment 401, such as the automated vehicle 402, the roadway 405, and a drivable surface boundary 407 following contours of the roadway 405. The graphical representations 400 further include virtual representations depicting logical aspects of planning the candidate trajectory. The virtual representations shown in FIGS. 4A-4B include a lefthand inner boundary 409, a righthand inner boundary 411, control points 412a-412d (P0, P1, P2, P3), and a predicted trailer path 413.

The candidate trajectory includes a tractor path (not shown) and trailer path 413. The tractor path is the drive line followed by the tractor to perform the J-hook. Generally, the tractor path follows a drive line proximate to (e.g., within a few feet of) the automated vehicle's righthand boundary 405. The autonomy system adjusts the tractor path to cause the trailer path 413. The trailer path 413 is the result of tractor's behavior. The autonomy system generates an estimated curve for the trailer path 413 that traverses the intersection 403 without violating the left boundary 409 (or drivable surface boundary 407). The autonomy system also generates an estimated tractor path that would cause the trailer path 413 but would not violate the right boundary 411 (drivable surface boundary 407). The candidate trajectory for performing the J-hook includes the various determinations associated with the automated vehicle 402 navigating the intersection 403, including the tractor path and the trailer path 413.

The autonomy system places control points 412a-412d in space to compute the curve of the trailer path 413 and tractor path, where the control points 412a-412d represent points in space along the trailer path 413. As an example, in some implementations, the curve includes a Bezier curve computed by autonomy system using the control points 412a-412d. The control points 412a-412d represent an entry point 412a (P0) of the trailer 406, middle points 412b-412c (P1, P2) of the trailer path 413, and an exit point 412d (P3) of the trailer 406. The entry point 412a is a fixed point in space where the trailer 406 or automated vehicle 402 enters the intersection 403 or initial point for performing the J-hook turn. The exit point 412d is another fixed point in space where the trailer 406 or automated vehicle 402 exits the intersection 403 or termination point of performing the J-hook turn. The middle points 412b-412c (P1, P2) are adjustable points in space referenced by the autonomy system to generate the curve of the predicted or planned trailer path 413 of the candidate trajectory. In some cases, the autonomy system generates and places the entry point 412a and exit point 412d when the autonomy system detects the intersection in the map data and identifies the need to perform the J-hook turn. The autonomy system executes the various types of planning functions for planning the J-hook turn, allowing the autonomy system to place and adjust the middle points 412b-412c.

The autonomy system generates the entry point 412a, exit point 412d, and the middle points 412b-412c at points in space within the intersection 403. The autonomy system generates the predicted trailer path 413 by applying a geometry or curve-planning function using the control points 412a-412d. The autonomy system then generates the predicted tractor path that would cause the trailer path 413 relative to parameters and geometry of the trailer 406 (e.g., length of the trailer 406, total length of the automated vehicle 402). In some cases, the autonomy system determines the left inner boundary 409 and the right inner boundary 411 through the intersection 403 by forward-propagating an existing left inner boundary 409 and existing right inner boundary 411 (in place before entering the intersection 403) relative to the trailer path 413 and the tractor path. In some cases, the autonomy system generates or modifies the left inner boundary 409 and right inner boundary 411 based upon additional information indicating obstacles (e.g., sensor data with detected traffic vehicles in a portion of the intersection 403). The autonomy system then generates and models the predicted trailer path 413 and the requisite tractor path to evaluate whether the predicted trailer path 413 and the requisite tractor path would satisfy the requirements (e.g., accomplish the J-hook without violating the boundaries).

As an example, the autonomy system models the predicted trailer path 413 by forward-propagating the virtual representations of the trailer 406 from the entry point 412a, along the estimated curve via the middle points 412b-412c, to the exit point 412d. The autonomy system models the predicted tractor path 413 by forward-propagating the virtual representation of the tractor 404 from the entry point 412a to the exist point 412d, following a drive line that would cause the trailer path 413.

With reference to FIG. 4A, the autonomy system generates an earlier iteration of the predicted trailer path 413 and tractor path for the earlier iteration of the candidate trajectory. In the earlier iteration, the autonomy system places middle points 412b-412c that cause the autonomy system to generate a resulting trailer path 413 violating the left inner boundary 409 for the earlier iteration. When the autonomy system models the components of the candidate trajectory, the autonomy system determines that the predicted trailer path 413 fails the left boundary 409 as a trajectory requirement, causing the autonomy system to recompute the components of candidate trajectory as a later iteration.

With reference to FIG. 4B, the autonomy system generates the later iteration of the predicted trailer path 413 and the tractor path for the later iteration of the candidate trajectory. In the later iteration, the autonomy system replaces the middle points 412b-412c that cause the autonomy system to generate the later resulting trailer path 413 satisfying the left inner boundary 409 for the later iteration. When the autonomy system models the components of the candidate trajectory, the autonomy system determines that the predicted trailer path 413 satisfies the left boundary 409 as the trajectory requirement, causing the autonomy system to send the candidate trajectory to downstream functions for executing the J-hook through the intersection 403.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for navigation planning for an automated vehicle, the method comprising:
    detecting, by a processor of the automated vehicle, an intersection requiring a J-Hook turn according to map data having the intersection;
    generating, by the processor, a plurality of boundaries, including one or more inner boundaries and a drivable surface boundary restricting the automated vehicle to drive therebetween;
    wherein the processor determines the one or more inner boundaries by forward-propagating one or more existing inner boundaries prior to approaching the intersection;
    generating, by the processor, a plurality of control points relative to the one or more inner boundaries and the drivable surface boundary and defining a curve for a trailer path of a trailer portion of the automated vehicle, the plurality of control points including an entry point, an exit point, and one or more dynamically adjustable middle points;
    generating, by the processor, a trailer path of the automated vehicle using the plurality of control points for the curve, and a tractor path of a tractor portion of the automated vehicle based upon the trailer path, thereby generating a candidate trajectory having the tractor path and trailer path;
    in response to the processor determining that the candidate trajectory fails to satisfy a boundary of the plurality of boundaries, updating, by the processor, the candidate trajectory by iteratively adjusting the one or more dynamically adjustable middle points of the plurality of control points defining the curve of the trailer path while holding the entry point and the exit point fixed, and until the updated candidate trajectory is determined to satisfy the plurality of boundaries; and
    controlling operation of the automated vehicle to travel along the updated candidate trajectory.

2. The method according to claim 1, further comprising, for each middle point of the one or more dynamically adjustable middle points, determining, by the processor, a set of coordinates for generating the curve of the trailer path.

3. The method according to claim 2, wherein the curve of the trailer path is a Bezier curve generated by the processor using the plurality of control points according to an optimization function.

4. The method according to claim 1, wherein the processor iteratively updates the candidate trajectory to identify the candidate trajectory satisfying each boundary of the plurality of boundaries.

5. The method according to claim 4, wherein iteratively adjusting the one or more dynamically adjustable middle points includes determining, by the processor, a first cost for the trailer path and a second cost for the tractor path according to a cost function of an optimization function, wherein the processor adjusts each middle point of the one or more dynamically adjustable middle points to minimize each cost for each iteration.

6. The method according to claim 1, wherein the drivable surface boundary represents a navigable portion of a road bounded by a driving boundary, and wherein the processor determines the drivable surface boundary based upon map data for the intersection.

7. The method according to claim 1, wherein the processor determines the one or more inner boundaries based upon identifying an adjacent travel lane.

8. The method according to claim 1, wherein the processor applies a safety buffer distance for determining the one or more inner boundaries.

9. The method according to claim 1, wherein the processor applies a permissive buffer distance for determining the one or more inner boundaries and the drivable surface boundary.

10. The method according to claim 1, further comprising modeling, by the processor, the trailer path and the tractor path of the candidate trajectory by forward propagating a representation of the automated vehicle according to the candidate trajectory.

11. A system for navigation planning for an automated vehicle, the system comprising:
 a non-transitory computer-readable memory on board an automated vehicle configured to store map data associated with a geographic location having an intersection; and
 a processor of the automated vehicle configured to:
  detect an intersection requiring a J-Hook turn according to map data having the intersection;
  generate a plurality of boundaries, including one or more inner boundaries and a drivable surface boundary restricting the automated vehicle to drive therebetween;
  wherein the processor determines the one or more inner boundaries by forward-propagating one or more existing inner boundaries prior to approaching the intersection;
  generate a plurality of control points relative to the one or more inner boundaries and the drivable surface boundary and defining a curve for a trailer path of a trailer portion of the automated vehicle, the plurality of control points including an entry point, an exit point, and one or more dynamically adjustable middle points;
  generate a trailer path of the automated vehicle using the plurality of control points for the curve, and a tractor path of a tractor portion of the automated vehicle based upon the trailer path, thereby generating a candidate trajectory having the tractor path and trailer path;
  in response to the processor determining that the candidate trajectory fails to satisfy a boundary of the plurality of boundaries, update the candidate trajectory by iteratively adjusting the one or more dynamically adjustable middle points of the plurality of control points defining the curve of the trailer path while holding the entry point and the exit point fixed, and until the updated candidate trajectory is determined to satisfy the plurality of boundaries; and
  control operation of the automated vehicle to travel along the updated candidate trajectory.

12. The system according to claim 11, wherein the processor is further configured to, for each middle point of the one or more dynamically adjustable middle points, determine a set of coordinates for generating the curve of the trailer path.

13. The system according to claim 12, wherein the curve of the trailer path is a Bezier curve generated by the processor using the plurality of control points according to an optimization function.

14. The system according to claim 11, wherein the processor iteratively updates the candidate trajectory to identify the candidate trajectory satisfying each boundary of the plurality of boundaries.

15. The system according to claim 14, wherein when iteratively adjusting the one or more dynamically adjustable middle points, the processor is further configured to determine a first cost for the trailer path and a second cost for the tractor path according to a cost function of an optimization function, and wherein the processor adjusts each middle point of the one or more dynamically adjustable middle points to minimize each cost for each iteration.

16. The system according to claim 11, wherein the drivable surface boundary representing a navigable portion of a road bounded by a driving boundary, and wherein the processor determines the drivable surface boundary based upon map data for the intersection.

17. The system according to claim 11, wherein the processor determines the one or more inner boundaries based upon identifying an adjacent travel lane.

18. The system according to claim 11, wherein the processor applies a safety buffer distance for determining the one or more inner boundaries.

19. The system according to claim 11, wherein the processor applies a permissive buffer distance for determining the one or more inner boundaries and the drivable surface boundary.

20. The system according to claim 11, wherein the processor is further configured to model the trailer path and the tractor path of the candidate trajectory by forward propagating a representation of the automated vehicle according to the candidate trajectory.

* * * * *